United States Patent [19]  [11] 4,290,897
Swihart  [45] Sep. 22, 1981

[54] DEWATERING FINE COAL SLURRIES USING TWO TYPES OF ORGANOPOLYSILOXANES

[75] Inventor: Terence J. Swihart, Essexville, Mich.

[73] Assignee: Dow Corning Corporation, Midland, Mich.

[21] Appl. No.: 153,810

[22] Filed: May 27, 1980

[51] Int. Cl.$^3$ .............................................. C02F 1/56
[52] U.S. Cl. .................................. 210/710; 210/728; 210/729; 210/732; 210/770; 210/778; 209/5
[58] Field of Search ................ 209/5; 210/42 R, 45, 210/49, 51–54, 68, 75, 702, 703, 710, 712, 725, 727, 728, 729, 732, 770, 771, 778; 260/29.2 M, 37 SB; 528/35; 34/12, 14

[56] References Cited

U.S. PATENT DOCUMENTS

| | | | |
|---|---|---|---|
| 2,587,636 | 3/1952 | MacMullen | 260/29.2 M |
| 3,294,725 | 12/1966 | Findlay et al. | 260/37 SB |
| 3,700,715 | 10/1972 | Berger | 210/54 |
| 3,729,496 | 4/1973 | Berger | 210/54 |
| 3,817,861 | 6/1974 | Slusarczuk et al. | 210/54 |
| 3,946,061 | 3/1976 | Buckman et al. | 210/54 |
| 4,026,880 | 5/1977 | Mitchell | 209/5 |
| 4,210,531 | 7/1980 | Wang et al. | 210/53 |

FOREIGN PATENT DOCUMENTS 2149329  4/1972  Fed. Rep. of Germany ........ 210/54

*Primary Examiner*—Peter A. Hruskoci
*Attorney, Agent, or Firm*—George A. Grindahl

[57] ABSTRACT

Aqueous slurries of fine coal are dewatered by a process which comprises mixing a mixture of a water-soluble organopolysiloxane and a water-emulsifiable organopolysiloxane with the slurry, separating the slurry to recover the fine coal and further drying the fine coal, if desired. The use of a mixture of a water-soluble organopolysiloxane and a water-emulsifiable organopolysiloxane unexpectedly provides improved separating and/or improved drying of fine coal compared to a dewatering process that uses only one of the organopolysiloxanes.

10 Claims, No Drawings

4,290,897

DEWATERING FINE COAL SLURRIES USING TWO TYPES OF ORGANOPOLYSILOXANES

BACKGROUND OF THE INVENTION

The present invention relates to a process for dewatering fine coal. In one aspect, this invention relates to a process for filtering an aqueous slurry of fine coal. In another aspect, this invention relates to a process for drying fine coal.

In the mining, cleaning and transporting of coal, considerable quantities of water and fine coal are processed. For example, continuous coal mining, which uses large quantities of water, produces wet coal which is finer and dirtier than coal produced by other mining processes. Additionally, coal-cleaning frequently includes water-washing, crushing and froth-floating which produce slurried fine coal. Furthermore, transporting coal in water-slurry form is sometimes practiced.

Fine coal is dewatered for various reasons, such as to improve its storing, handling and burning. This dewatering of fine coal is currently done by centrifuging and/or filtering a slurry of fine coal and evaporating water from wet coal obtained thereby. Centrifuging or filtering an aqueous slurry can produce fine coal having a water content of approximately 15 to 20 percent by weight. Drying can remove up to 100 percent of the surface water of fine coal. For example, drying of fine coal at 90° C. to constant weight provides fine coal having a surface water content of zero percent, although capillary water may still be present.

For the purposes of this disclosure, the term fine coal means coal that will pass through a 28 mesh screen; the term water content means the total amount of surface water in a coal sample, excluding capillary water in the coal; and the term dewatering is generic to separating, such as filtering or centrifuging, and drying, such as evaporating, heating or blowing.

Because thermal drying of fine coal requires considerable energy and adds to air pollution, the centrifuging and filtering of fine coal slurries have received extensive and intensive study by the industry with the objective of decreasing the water content of the coal to the extent that thermal drying can be reduced or eliminated. While the mechanical aspects of centrifuging and filtering a slurry of fine coal such as slurry throughput, slurry temperature, slurry concentration, air flow, pressure differential, centrifuge speed and disk speed have received considerable attention, the chemical aspects thereof have received only slight attention.

It has been known for a long time that the use of certain surfactants improve the dewatering of fine coal via filtering. For example, small amounts of sodium lauryl sulfate, mixed with a fine coal slurry to be filtered or, alternatively, sprayed as an aqueous solution on a filter cake of fine coal, produces a drier product than the product obtained by unmodified filtration. On the other hand, the use of lauryl ammonium bromide as the surfactant is substantially ineffective in the same experiment.

However, the use of surfactants is not completely satisfactory. For example, sodium lauryl sulfate can cause undesirable foaming of the slurry, and blinding of the filter during the filtering process.

It is also disclosed by Gordon et al. in an application for U.S. patent, assigned to the assignee of this invention and filed on even date therewith, that an aqueous slurry of fine coal may be dewatered, with unexpected results, by mixing a water-soluble organopolysiloxane or a water-emulsifiable organopolysiloxane with the aqueous slurry of fine coal. While the process of Gordon et al. improves the dewatering of fine coal, further improvements therein are desired.

SUMMARY OF THE INVENTION

It is an object of the present invention to provide a process for dewatering an aqueous slurry of fine coal. It is a further object of the present invention to provide a process for filtering a slurry of fine coal. It is another object of this invention to provide a process for drying fine coal.

These and other objects, which will become obvious to one skilled in the coal-preparing art upon consideration of the following specification and appended claims, are obtained by mixing effective amounts of a water-soluble organopolysiloxane and a water-emulsifiable organopolysiloxane into an aqueous slurry of fine coal, separating the resulting mixture to remove water and, optionally, drying the separated fine coal.

Surprisingly, the process of this invention not only provides fine coal that is drier than fine coal that has been dewatered with or without the aid of a single organopolysiloxane, it also provides fine coal that is more readily further dried than fine coal that has been so dewatered.

Thus, the present invention comprises two aspects; i.e., a process for dewatering an aqueous slurry of fine coal to provide, in one aspect, fine coal having a water content of less than 20 percent by weight and, in another aspect, dewatered fine coal that is more readily dried.

DETAILED DESCRIPTION OF THE INVENTION

The present invention relates to a process for dewatering an aqueous slurry of fine coal, said process comprising (I) mixing a dewatering-improving amount of a water-soluble organopolysiloxane plus a water-emulsifiable organopolysiloxane with the aqueous slurry of fine coal, (II) separating the organopolysiloxanes-containing aqueous slurry of fine coal into an aqueous portion and a fine coal portion, said fine coal portion having a water content of less than 20 percent by weight and, optionally, (III) drying said fine coal portion to further reduce the water content thereof.

The present invention is applicable to any aqueous slurry of fine coal comprising from 20 to 95 percent by weight of water. Preferably, the aqueous slurry of fine coal to be dewatered has a water content of from 50 to 90 percent by weight because fine coal slurries having less than 50 percent water are difficult to pump and slurries having more than 90 percent water are less economical to dewater.

The process of this invention is particularly useful for dewatering an aqueous slurry of fine coal having a water content of from 65 to 75 percent by weight, such as the float product that is obtained from a conventional froth flotation cell that is used in a coal-cleaning process.

Other examples of aqueous fine coal slurries that can be dewatered by the process of this invention include fine coal transported in slurry form, overflow product and underflow product of classification cyclones, and thickener underflow.

Preferably the fine coal in the aqueous slurry to be dewatered had been deslimed and has a particle size of from 28 to 200 mesh.

It is believed that the unexpected results of the process of this invention disclosed herein arises from a cooperative action of a water-soluble organopolysiloxane and a water-emulsifiable organopolysiloxane at the coal-water interface in the aqueous slurry of fine coal. Accordingly the present invention contemplates the use of any water-soluble organopolysiloxane plus any water-emulsifiable organopolysiloxane.

Water-soluble and water-emulsifiable organopolysiloxanes which are useful in the process of this invention have the formula $R_aH_bSiO_{(4-a-b)/2}$ wherein a and b are numbers, the sum of which has an average value of from greater than zero to less than four, preferably from 0.9 to 2.5, b has an average value of from zero to a and R denotes an organic radical bonded to a silicon atom by a silicon-carbon bond. It is contemplated that a small portion of the R radicals, such as siloxane-chain terminal radicals, may be silicon-atom-bonded hydroxyl radicals and/or organic radicals bonded to a silicon atom by way of a hydrolyzable bond, such as a silicon-oxygen bond or a silicon-nitrogen bond.

Examples of the types of organopolysiloxanes that are encompassed by the above formula include linear polymers of the formula $R_3SiO(R_2SiO)_dSiR_3$, wherein d is a number from 1 to 1000, resinous polymers of the formula $(RSiO_{3/2})_d$, branched polymers of the formula $R_eSi\{(OSiR_2)_dOSiR_3\}_{4-e}$, wherein e is 0 or 1, cyclic polymers of the formula $(R_2SiO)_f$, wherein f is a number from 3 to 10, and silica copolymers having $R_3SiO_{1/2}$ siloxane units and $SiO_{4/2}$ siloxane units.

In the above formulae R denotes any organic radical, such as any hydrocarbon radical such as any alkyl, alkenyl, alkynyl, cycloaliphatic, aryl or arylalkyl radical, or any substituted hydrocarbon radical wherein said substituents include halogen, hydroxy, alkoxy, aryloxy, carboxy, carbalkoxy, amino, substituted amino, polyalkyleneoxy, mercapto, substituted mercapto, polyalkyleneimine, amido, nitro, and the like.

Specific examples of organic radicals that are contemplated as R radicals in the above formulae include $CH_3$, $CH_3CH_2$, $CH_3CH_2CH_2$, $(CH_3)_2CH$, $C_6H_{11}$, $C_6H_5$, $CH_2=CH$, $CH_3C_6CH_4$, $ClCH_2CH_2CH_2$, $Cl_2C_6H_3$, $CF_3CH_2CH_2$, $HO_2CCH_2SCH_2CH_2$, $HO_2CCH_2CH_2$, $HO_2CCH(CH_3)CH_2$, $HSCH_2CH_2CH_2$, $H_2NCH_2CH_2CH_2$, $H_2NCH_2CH_2NHCH_2CH_2CH_2$,

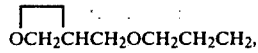
$OCH_2CHCH_2OCH_2CH_2CH_2$, $(HOCH_2CH_2)_2NCH_2CH_2CH_2$, $HO(CH_2CH_2O)_nCH_2CH_2CH_2$, $CH_3O(CH_2CH_2O)_nCH_2CH_2CH_2$, $CH_3CO_2(CH_2CH_2O)_nCH_2CH_2CH_2$, $HO(CH(CH_3)CH_2O)_mCH_2CH_2CH_2$, $CH_3O(CH(CH_3)CH_2O)_mCH_2CH_2CH_2$, $CH_3CO_2(CH(CH_3)CH_2O)_mCH_2CH_2CH_2$ and $HO(CH(CH_3)CH_2O)_m(CH_2CH_2O)_nCH_2CH_2 CH_2$ wherein m and n have average values of from 2 to 20.

Although it is believed that the two types of organopolysiloxanes that are co-used in the process of this invention may each contain any R radical or mixture of R radicals, provided one of said organopolysiloxanes is water-soluble and the other is water-emulsifiable, it is preferred that both organopolysiloxanes are methylorganopolysiloxanes wherein at least 50 percent, but not all, of the R radicals therein are the methyl radical, the balance of R radicals in the water-soluble methylorganopolysiloxane being polyethyleneoxy-substituted radicals in sufficient number to render the methylorganopolysiloxane water-soluble and the balance of R radicals in the water-emulsifiable methylorganopolysiloxane being polypropyleneoxy-substituted radicals.

Said preferred methylorganopolysiloxanes are most preferably liner fluids having the formulae $GMe_2SiO(Me_2SiO)_i(MeGSiO)_jSiMe_2G$ or $Me_3SiO(Me_2SiO)_i(MeGSiO)_jSiMe_3$ wherein i and j denote a number having an average value of from 0 to 100 and 1 and 100, respectively, Me denotes the methyl radical and G denotes a polyethyleneoxy-substituted radical having the formula $R'O(CH_2CH_2O)_nR''$- or a polypropyleneoxy-substituted radical having the formula $R'O(CH(CH_3)CH_2O)_mR''$- wherein n and m each denote a number having an average value of from 2 to 20, R' denotes a terminating radical such as hydrogen; alkyl, such as methyl, ethyl, propyl and isopropyl; and acyl, such as acetyl and propionyl; and R" denotes an alkylene radical such as $-CH_2CH_2-$, $-CH_2CH_2CH_2-$, $-CH_2CH(CH_3)-$, $-CH_2CH(CH_3)CH_2-$, and $-CH_2CH_2CH_2CH_2-$.

The organopolysiloxanes that are useful in the process of this invention may be prepared by any of the methods disclosed in the art. Most useful organopolysiloxanes have been disclosed in the voluminous organopolysiloxane art; others may be prepared by obvious extensions of said art.

A well-known, and preferred, method for synthesizing the most-preferred methylorganopolysiloxanes that are used in the process of this invention is the addition reaction between a methylhydrogenpolysiloxane having the formula $Me_3SiO(Me_2SiO)_i(MeHSiO)_kSiMe_3$ and an olefinically substituted polyoxyalkylene, such as $HO(CH_2CH_2O)_{12}CH_2CH=CH_2$, to give rise to $Me_3SiO(Me_2SiO)_i(MeGSiO)_j(MeHSiO)_{k-j}SiMe_3$ wherein G denotes a polyalkyleneoxy-substituted radical, such as $HO(CH_2CH_2O)_{12}CH_2CH_2CH_2-$, i denotes a number having an average value of from 0 to 100 and j and k each denote a number having an average value of from 1 to 100 and j is preferably, but not necessarily, equal to k.

In the process of this invention the water-soluble organopolysiloxane and the water-emulsifiable organopolysiloxane each may be mixed with the aqueous slurry of fine coal in an undiluted form or in a diluted form, such as in an aqueous solution or in an aqueous emulsion. Water-emulsifiable organopolysiloxanes are preferably not mixed with the aqueous slurry of fine coal in the undiluted form.

A suitable water-emulsifiable organopolysiloxane may be self-emulsifying or it may be emulsified with the aid of one or more surfactants or it may be prepared in emulsified form by emulsion polymerization of a suitable monomer.

Because so little of the organopolysiloxanes are used in the process of this invention, it is preferred that the organopolysiloxanes be mixed with the aqueous slurry of fine coal in diluted form, such as an aqueous solution and an aqueous emulsion, each comprising less than 50 percent organopolysiloxane. Mixing the organopolysiloxanes with the aqueous slurry of fine coal in a diluted form is also thought to provide a more uniform distribution of the organopolysiloxanes throughout the slurry and on the particles of fine coal therein.

Most preferably the water-soluble organopolysiloxane and the water-emulsifiable organopolysiloxane are premixed in the same water phase to provide a diluted mixture of the organopolysiloxanes which is then added to the aqueous slurry of fine coal.

It is also within the scope of and spirit of this invention to mix the diluted or undiluted organopolysiloxanes with an aqueous phase prior to the slurrying of fine coal therein to provide a uniform distribution of organopolysiloxanes in the aqueous slurry and on the particles of fine coal that is subsequently slurried therein.

The organopolysiloxanes may be mixed with the aqueous slurry of fine coal at any temperature and at any time prior to the separation of the slurry into an aqueous portion and a fine coal portion having a water content of less than 20 percent by weight. It is only necessary to thoroughly mix the two types of organopolysiloxanes with the aqueous slurry of fine coal to be dewatered. Preferably the organopolysiloxanes are mixed with the aqueous slurry of fine coal after any coal-cleaning step, such as flotation.

While the most effective amounts of any water-soluble organopolysiloxane and any water-emulsifiable organopolysiloxane, relative to each other and to the amount of coal slurry to be dewatered, have not been completely determined at this time, it is expected that said amounts can be readily determined by a continuation of the experiments that are set forth in the Examples, hereinafter disclosed.

In accordance with the scope and spirit of this invention it is expected that a coal-dewatering process which uses a water-soluble organopolysiloxane to improve the separating and/or drying of fine coal will be further improved when from 1 to 99 percent, preferably from 20 to 80 percent, by weight of the water-soluble organopolysiloxane is replaced with a water-emulsifiable organopolysiloxane. That is to say, the weight ratio of the water-soluble organopolysiloxane to the water-emulsifiable organopolysiloxane that are used in the process of this invention has a value of from 1/99 to 99/1 and preferably from 20/80 to 80/20.

The total amount of organopolysiloxane to be mixed with the aqueous slurry of fine coal is merely that amount that will improve its dewatering, i.e. the separating of the water from the slurry and/or the drying of the fine coal obtained thereby. Said improvements in dewatering are directed principally to separating more water from the aqueous slurry to provide drier fine coal and/or decreasing the amount of time and/or energy required to dry the fine coal compared to the simple separating processes in the art. However, other dewatering improvements, such as a faster rate of water separation, may also be desired and are suitable criteria within the scope of this invention for determining an effective amount of both organopolysiloxanes to be used.

It is estimated that the minimum total amount of 100% organopolysiloxanes that is effective in the process of this invention will vary with the particular organopolysiloxanes that are used but will not be less than approximately 0.1 part by weight for every 1000 parts by weight of fine coal in the aqueous slurry and/or less than 0.1 part by weight for every 1000 parts by weight of water in the aqueous slurry.

From a consideration of organopolysiloxane cost, as little organopolysiloxane as is effective should be used.

However, from other considerations, such as the maximum rate of separating the aqueous slurry, the maximum rate of drying the separated coal, the maximum amount of water separated from the slurry, the extent to which the separated aqueous portion is used for additional coal processing and the type of separating process that is used, the use of more than minimally effective amounts of both organopolysiloxanes may be desired.

The thoroughly mixed aqueous slurry of fine coal containing an effective amount of the two types of organopolysiloxanes is subsequently separated into an aqueous portion and a fine coal portion containing less than 20 percent by weight water, based on the total weight of fine coal plus water. By subsequently it is meant immediately or at a later time such as after a period of holding, conditioning, mixing, blending, heating, cooling, transporting, sieving, classifying, or partially dewatering the mixture to be separated.

Any suitable means of separating the aqueous slurry of fine coal containing the organopolysiloxanes is contemplated by this invention; such as vacuum filtration, pressure filtration, gravity filtration, solid-bowl centrifugation, screen-bowl centrifugation and suitable combinations of separating means.

The aqueous portion that is obtained from said separating step can be recycled to form another slurry of fine coal, after being rejuvenated with additional organopolysiloxanes as needed, in accordance with the process of this invention.

The fine coal portion that is obtained from said separating step, in many cases, needs no further dewatering before it is further processed, such as agglomerated and/or blended and/or utilized. Occasionally said fine coal is advantageously further dewatered by drying.

The process of this invention, thus, optionally comprises a drying step to further dewater the fine coal produced thereby. Said drying may be done by any means such as by evaporating, forced air drying, steam drying or heating and suitable combinations of drying means and at any suitable time such as while the fine coal is retained by the separating means such as in the filtering screen, or after it is removed therefrom.

Surprisingly, the drying of fine coal that has been produced by the separating process of this invention occurs more rapidly than the drying of fine coal having the same size-consist that has been produced by a slurry-separating process which uses only one of the organopolysiloxanes.

The following examples are disclosed to further teach how to best practice the present invention and not to limit said invention.

Pressures were measured in millimeters of mercury and were converted to kilopascals for this disclosure by multiplying by 133.3324 and rounding off.

All parts and percentages are by weight unless otherwise stated.

Fine Coal—Lower Freeport bed coal collected at the Barnes and Tucker Lancashire No. 25 coal preparation plant was used in these examples. The sample was prepared by stage crushing through a roll crusher and a hammer mill to obtain a nominal 35-mesh product and was floated in a standard laboratory Wemco Fagergren flotation cell using a methyl isobutyl carbinol frother.

Organopolysiloxanes—The organopolysiloxanes that were used in these examples are denoted therein by identifying letters, which have the following meanings.

A. A water-soluble methylorganopolysiloxane having the approximate average formula $Me_3SiO(MeYSi-$ O)$_{10}$SiMe$_3$ wherein Y denotes —(CH$_2$)$_3$(OCH$_2$CH$_2$)$_{12}$OH B. A 50% emulsion of a water-emulsifiable methylorganopolysiloxane having the approximate average formula Me$_3$SiO(Me$_2$SiO)$_{67}$(MeZSiO)$_3$SiMe$_3$, where Z denotes —(CH$_2$)$_3$(OCH$_2$CH(CH$_3$))$_{2.5}$OH, in water comprising approximately 1.5% sodium dioctylsulfosuccinate.

C. A mixture of 73 parts of water-soluble organopolysiloxane A and 54 parts of emulsion B containing 27 parts of emulsified organopolysiloxane.

D. A mixture of 50 parts of water-soluble organopolysiloxane A and 100 parts of emulsion B containing 50 parts of emulsified organopolysiloxane.

Separating Apparatus—In the following examples fine coal slurries were filtered on a glass filter tube which had been fitted with No. 1 Whatman filter paper and connected by way of a shut-off valve, to a vacuum reservoir maintained at a vacuum of 500 mm. of Hg (66.7 kPa).

Preparing and Dewatering Coal Slurries—In the following examples a weighed amount of organopolysiloxane(s) was (were) thoroughly mixed with 100 ml. of water. Twenty-three (23) milliliters of the resulting mixture was added to a 250 ml. Erlenmeyer flask containing a 10 gram sample of 35-mesh coal to provide an organopolysiloxane(s)-containing aqueous emulsion of fine coal having a water content of 70 percent. The flask was stoppered and shaken for 2 minutes. The slurry was then poured into the above-described filter tube and the shut-off valve to the vacuum reservoir was opened immediately. During filtration the vacuum would fall to 470 to 480 mm. of Hg (62.7 to 64.0 kPa). This vacuum was maintained for 150 seconds, after which time the filter tube was removed and the filtered coal was weighed (P$_w$) into a drying dish. The drying dish was covered with perforated aluminum foil to eliminate the possibility of losing coal during drying and the covered dish was placed in an air-circulating oven at 90° C. for 90 minutes to completely dry the coal, after which the dry coal was weighed (P$_d$).

The water content of the filtered fine coal was calculated using the following formula where P$_w$ denotes the weight of the filtered coal and P$_d$ denotes the weight of the dried coal.

Water Content (%) = 100 $(P_w - P_d)/P_w$.

The improvement in dewatering that was obtained by the process of this invention, compared to the same dewatering process which used not dewatering additive (control), was calculated using the following formula, where Q$_c$ denotes the water content of the filtered control sample and Q$_i$ denotes the water content of the filtered sample that was produced by the process of this invention.

Improvement (%) = 100 $(Q_c - Q_i)/Q_c$.

EXAMPLES 1 to 3

In these examples, detailed in Table I with numerous comparison examples and control examples, the water that was used to prepare the slurry of fine coal had a temperature of 45° C., except where otherwise indicated. The improvement in dewatering that was obtained by the process of this invention during filtration ranged from 27.2 to 46.8 percent compared to a control slurry of the same temperature.

The unexpected result of this invention is clearly shown in Example 2 wherein a mixture of organopolysiloxanes A and B provided an improvement greater than the improvement that was obtained by an equal weight of either organopolysiloxane A (Comparison #2) or organopolysiloxane B (Comparison #3). Even better results were obtained in Example 1.

TABLE I

| Example No. | Organopolysiloxane | | | Filtered Fine Coal | |
|---|---|---|---|---|---|
| | Identifier | Amount, grams[1] | | Water Content, % | Improvement, %[3] |
| | | per l. H$_2$O | per kg. coal | | |
| Control #1 | None | 0[2] | 0 | 21.90 | 0 |
| Control #2 | None | 0 | 0 | 17.30 | 0 |
| 1 | C | 0.17 | 0.38 | 9.20 | 46.8 |
| 2 | D | 0.22 | 0.50 | 12.60 | 27.2 |
| 3 | D | 0.22[2] | 0.50 | 14.40 | 34.2 |
| Comparison #1 | A | 0.11 | 0.25 | 14.38 | 16.9 |
| Comparison #2 | A | 0.22 | 0.50 | 15.55 | 10.1 |
| Comparison #3 | B | 0.22 | 0.50 | 16.66 | 3.7 |
| Comparison #4 | B | 0.52[2] | 1.20 | 13.34 | 39.1 |
| Comparison #5 | B | 0.98[2] | 2.25 | 14.06 | 35.8 |

[1]Based on 100% organopolysiloxane
[2]Water temperature was 20° C.
[3]Compared to Control having same water temperature.

EXAMPLE 4

This example illustrates the method of this invention wherein the aqueous phase that was used to prepare an aqueous slurry of fine coal was a rejuvenated, recycled aqueous portion.

To 19 ml. of the aqueous portion that was obtained for Example 2 there was added 5.5 ml. of the original aqueous mixture of organopolysiloxane D. The resulting rejuvenated aqueous phase was then used to slurry a 10 gram sample of 35-mesh coal as described above. Separation of the resulting slurry was accomplished as above to provide a fine coal sample having a water content of 12.1 percent; an improvement of 30.1%.

EXAMPLE 5

This example further shows the improvement in the rate of drying of a filtered fine coal slurry at 90° C. that is produced by the process of this invention. A fully dried control sample, a fully dried comparison sample from comparison Example #3 and a fully dried sample from Example 2 which had been heated to dryness in an air-circulating oven at 90° C. were weighed into 4 oz. squat jars. To each sample was added enough water to normalize the water content at 15%. The jars were then sealed and allowed to stand at 25° C. for 24 hours after which time the seals were removed and the samples were placed in a forced air oven at 90° C. The samples were then weighed at various times to determine the rate at which water was eliminated. The results, tabulated in Table II, show that the fine coal prepared by the process of this invention is dried more easily than an untreated control sample.

TABLE II

| Example No. | Sample from Example No. | Water Content of Normalized Wet Fine Coal After Drying at 90° C. for | | | | | |
|---|---|---|---|---|---|---|---|
| | | 0 min | 5 min | 17 min | 27 min | 37 min | 57 min |
| 5 | 2 | 15.0 | 9.9 | 3.8 | 0 | — | — |
| Control #3 | Control | 15.0 | 13.2 | 9.5 | 6.0 | 2.1 | 0 |
| Comparison #6 | Comparison #3 | 15.0 | 11.7 | 4.8 | 0.8 | 0 | — |

That which is claimed is:

1. A process for dewatering an aqueous slurry of fine coal, said process comprising (I) mixing a dewatering-improving amount of a water-soluble organopolysiloxane plus a water-emulsifiable organopolysiloxane with the aqueous slurry of fine coal, said water-soluble organopolysiloxane and said water-emulsifiable organopolysiloxane having the formula $R_aH_bSiO_{(4-a-b)/2}$ wherein a and b are numbers, the sum of which has an average value of from greater than zero to less than four, b has an average value of from zero to a and R denotes an organic radical bonded to a silicon atom by a silicon-carbon bond, the weight ratio of the water-soluble organopolysiloxane to the water-emulsifiable organopolysiloxane having a value of from 1/99 to 99/1, (II) separating the organopolysiloxanes-containing aqueous slurry of fine coal into an aqueous portion and a fine coal portion, said fine coal portion having a water content of less than 20 percent by weight.

2. The process of claim 1 wherein said aqueous slurry of fine coal is the product of a flotation process.

3. The process of claim 1 wherein said aqueous slurry of fine coal has a water content of from 65 to 75 percent by weight.

4. The process of claim 1 wherein said separating comprises a filtering process.

5. The process of claim 1 wherein the fine coal portion containing less than 20 percent by weight water is dried by a heating process to further reduce the water content thereof.

6. The process of claim 1 wherein said fine coal has a nominal particle size of 28 to 200 mesh.

7. The process of claims 1, 2, 3, 4, 5 or 6 wherein the water-soluble organopolysiloxane is a methylorganopolysiloxane wherein at least 50 percent, but not all, of the R radicals therein are the methyl radical, the balance of R radicals being polyethyleneoxy-substituted radicals.

8. The process of claims 1, 2, 3, 4, 5, or 6 wherein the water-emulsifiable organopolysiloxane is a methylorganopolysiloxane wherein at least 50 percent, but not all, of the R radicals therein are the methyl radical, the balance of R radicals being polypropyleneoxy-substituted radicals.

9. The process of claims 1, 2, 3, 4, 5 or 6 wherein the water-soluble organopolysiloxane has the formula $Me_3SiO(MeYSiO)_{10\pm5}SiMe_3$ and the water-insoluble organopolysiloxane has the formula $Me_3SiO(Me_2SiO)_{67}(MeZSiO)_3SiMe_3$, Me denotes methyl, Y denotes $-CH_2CH_2CH_2(OCH_2CH_2)_{12}OH$ and Z denotes $-CH_2CH_2CH_2(OCH_2CH(CH_3))_{2.5}OH$.

10. The process of claim 9 wherein the weight ratio of the water-soluble organopolysiloxane to the water-emulsifiable organopolysiloxane has a value of from 20/80 to 80/20.

* * * * *

UNITED STATES PATENT AND TRADEMARK OFFICE
CERTIFICATE OF CORRECTION

PATENT NO. : 4,290,897
DATED : September 22, 1981
INVENTOR(S) : Terence J. Swihart It is certified that error appears in the above-identified patent and that said Letters Patent are hereby corrected as shown below In Column 3, line 47; the formula reading "$CH_3C_6CH_4$," should read "$CH_3C_6H_4$,".

In Column 3, line 61; the line reading "$H_2O)_m(CH_2CH_2O)_nCH_2CH_2\ CH_2$' should read "$H_2O)_m(CH_2CH_2O)_nCH_2CH_2CH_2$".

In Column 4, line 11; the word reading "liner" should read "linear".

In Column 8, line 4; the word reading "not" should read "no".

In Column 10; line 35; the portion of the formula reading "$SiO(MeYSiO)_{10\pm5}SiMe_3$" should read "$SiO(MeYSiO)_{10}SiMe_3$".

Signed and Sealed this

Twenty-fourth Day of November 1981

[SEAL]

Attest:

GERALD J. MOSSINGHOFF

Attesting Officer    Commissioner of Patents and Trademarks